Sept. 19, 1933.　　　C. A. RUDQVIST　　　1,927,616
POWER TRANSMISSION MECHANISM
Filed Dec. 9, 1929
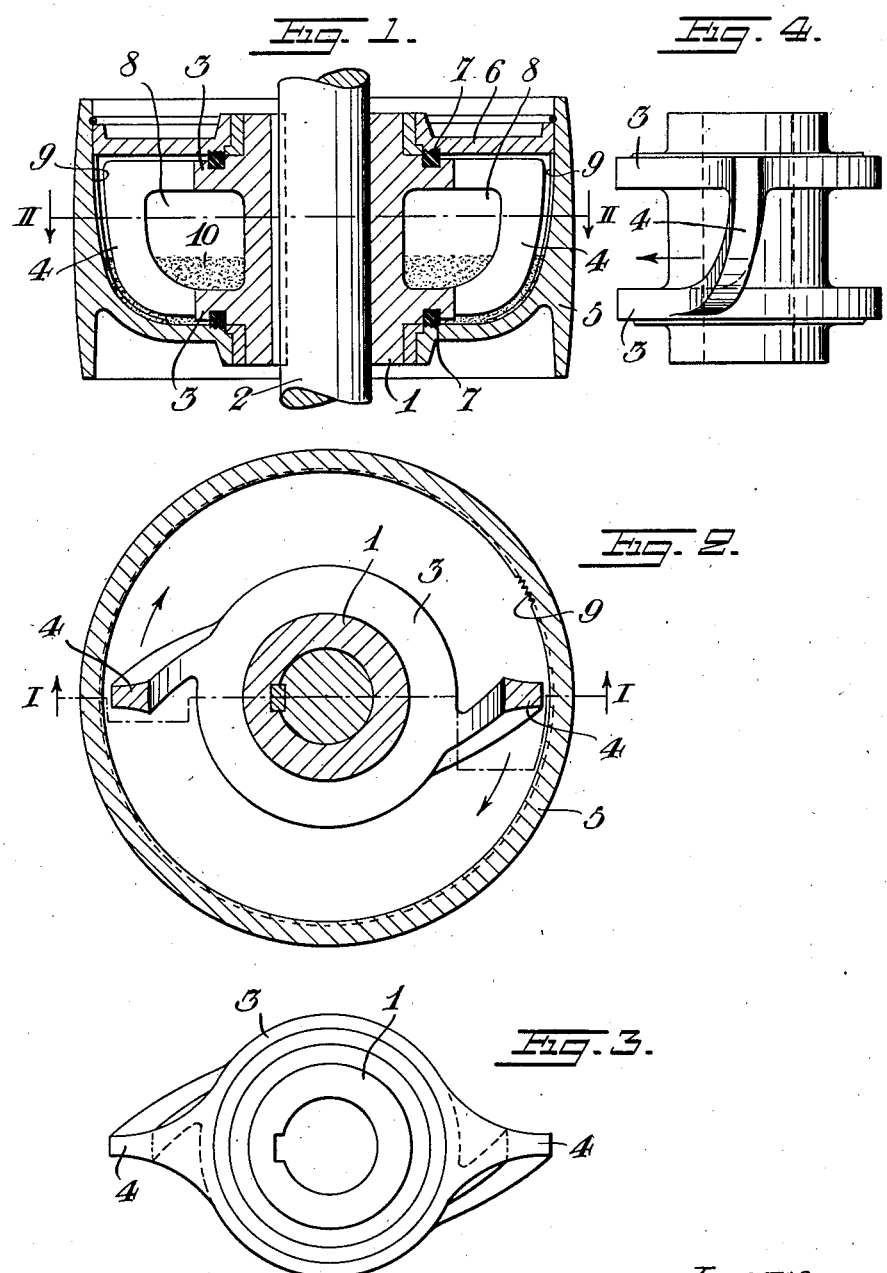

Patented Sept. 19, 1933

1,927,616

UNITED STATES PATENT OFFICE 1,927,616

POWER TRANSMISSION MECHANISM

Carl August Rudqvist, Stockholm, Sweden, assignor to Pulvis Aktiengesellschaft, Glarus, Switzerland, a corporation of Switzerland Application December 9, 1929. Serial No. 412,660

12 Claims. (Cl. 192—58)

This invention relates to power transmitting mechanisms and particularly to that type of such mechanisms which comprises relatively rotatable coaxially mounted driving and driven members and a mass of finely divided material to effect transmission of power from the driving member to the driven member due to the rotation of the former while allowing a slip between the driving and the driven members as soon as the resistance of the driven member exceeds a predetermined value.

The object of this invention is to provide a power transmission mechanism of the above type which is especially adapted for use in connection with vertical shafts, as, for instance, for the driving of milk separators or the like.

The power transmission mechanism according to this invention is of the type in which the driving member comprises a blade or blades and in which the driven member comprises a closed drum enclosing said blade or blades and which is partially filled with a finely divided material, as a powder or small balls of steel or other metal or other suitable material with or without a small amount of a dry lubricating substance, as graphite, added thereto.

The invention is characterized, chiefly, by the fact that the driving blade or blades is or are formed with a helicoidal operating surface so that the blade or blades when rotating about a vertical axis will act to lift the finely divided material so as to distribute it uniformly in the axial direction of the drum.

Another feature of the invention is that the inner surface of the drum is curved or inclined in such a way as to facilitate the lifting of the finely divided material.

In the drawing one embodiment of the invention is illustrated.

Fig. 1 is a vertical section of a clutch according to this invention taken on the line I—I in Fig. 2.

Fig. 2 is a horizontal section taken on the line II—II in Fig. 1.

Fig. 3 is an end view of the driving member of the clutch.

Fig. 4 is a side elevation of part of the driving member.

With reference to the drawing the numeral 1 indicates a hub secured to a vertical shaft 2. The hub 1 is formed with two axially spaced annular flanges 3. At diametrically opposed sides of the hub 3 said flanges carry two blades 4, 4. As will best appear from Fig. 4, the top and the base of each blade are displaced relatively to each other in peripheral direction. This is due to the fact the side surfaces of the blades are helicoidal for a purpose hereinbelow set forth.

Rotatably mounted on upper and lower extensions of the hub 1 is a drum 5 comprising a cup shaped receptacle closed by a cover 6. To effect tight closure of the drum packing material 7 is inserted between the drum, and the lower flange 3 and between the cover and the upper flange 3. The inside surface of the cup-shaped drum is curved as shown in Fig. 1 and the end surface of the blades is correspondingly curved.

The blades 4 are each formed with a comparatively large perforation, as shown at 8. The inner surface of the drum may be formed with corrugations, as shown at 9. The drum is formed with a belt pulley rim, as shown in Fig. 1.

I introduce either before mounting the cover 6 in place or through a separate port, not shown, a mass of finely divided material into the drum so as to partially fill same. Said material, which is indicated at 10 in Fig. 1, may consist of a powder or small balls of steel or other metal or other suitable material either alone or mixed with a small quantity of a dry lubricating or surface protecting material, as graphite, amounting to say a few percent of the entire mass.

The operation is as follows:

In the idle state of the clutch the mass of finely divided material will occupy the lowermost portion of the drum, as shown in Fig. 1. When the driving shaft 2 is started, the blades 4 are caused to move with the shaft relatively to the drum. It should be observed that the direction of movement should be such as indicated by the arrows in Figs. 2 and 4, that is, with the concave side surface of the blades directed in the direction of rotation. The blades when thus moving will tend to take the powdered material with them thereby causing the material to collect as a drift in front of each blade. Due to the centrifugal force to which said drifts will be subjected caused by the rotation of the blades the drifts will have their density increased so that the material of the drifts will be formed into a fixed mass which will transmit the power from the blades to the drum with an efficiency increasing according as the density of the mass increases. The drum will, as a result, be caused to rotate at a successively increased speed which finally will be synchronous with that of the driving blades.

The helicoidal operating surfaces of the blades will act to lift the powdered material as the blades engage the powdered material, like a screw. The helicoidal shape is determined to secure a uniform distribution of the mass along the axial length of the blades or drum. In order to facilitate said lifting action the inner surface of the drum is curved. The curvature of the drum and the angle of inclination of the blades are also determined with the object in view to obtain a desired starting characteristic.

The perforations in the blades will allow an automatic distribution of the powdered material in the peripheral direction of the drum to secure maintenance of balance of the clutch.

It is to be noted that the number of blades may be less than or greater than two without departing from the principle of the invention.

When the resistance as effected by the drum 5 due to the load thereon exceeds the driving power of the driving shaft in a predetermined degree a slipping effect will take place within the powdered mass allowing a lagging of the driven member relatively to the driving member.

I have disclosed one form of the invention which I believe to be the best adapted to carry the same into practice and it will be understood that the structure may be varied within the spirit and scope of the invention.

What I claim is:

1. A clutch comprising relatively rotatable coaxially mounted driving and driven members and a mass of finely divided material to transmit power between said members, the driving member comprising one or more blades having a helicoidal operating surface, and the driven member comprising a drum enclosing said one or more blades and being partially filled with said mass of finely divided material.

2. A clutch comprising a vertical shaft, a blade carrying element secured to said shaft, helicoidal perforated blades on said element, a drum mounted coaxially with said element and enclosing said blades and rotatable relative thereto, and a mass of finely divided material introduced in said drum to partially fill same.

3. A clutch comprising a vertical shaft, a blade carrying element secured to said shaft, helicoidal perforated blades on said element, a drum mounted coaxially with said element and enclosing said blades and rotatable relative thereto, and a mass of finely divided material introduced in said drum to partially fill same, said drum being shaped as a cup having a curved bottom and side surface.

4. A clutch comprising a vertical shaft, a blade carrying element on said shaft blades on said element, a drum mounted coaxially with said element and enclosing said blades and rotatable relative thereto, and a mass of finely divided material introduced in said drum to partially fill same, the blades of said element having a helicoidal operating surface to act to lift said mass due to rotation of said element, the drum being shaped as a cup having inclined bottom and side surfaces, the angle of inclination of said operating surface and said bottom and side surface determining the lifting characteristic of the blades.

5. A clutch comprising a vertical shaft, a blade carrying element on said shaft, perforated blades on said element, a drum mounted coaxially with said element and enclosing said blades and rotatable relative thereto, and a mass of finely divided material introduced in said drum to partially fill same, the blades of said element having a helicoidal operating surface to act to lift said mass due to rotation of said element, the drum being shaped as a cup having inclined bottom and side surfaces, and the angle of inclination of said operating surface and said bottom and side surface determining the lifting characteristic of the blades.

6. Power transmission mechanism comprising, in combination with a vertically disposed shaft, a driving member and a driven member coaxially mounted on the shaft and forming between them a chamber for the reception of finely divided material having an appreciable coefficient of internal friction, said driving member comprising blade elements shaped to cooperate with an amount of such material partially filling said chamber to lift the material and form drifts thereof serving when acted on by centrifugal force to transmit power from the driving member to the driven member, and said driving member being shaped with respect to the driven member to permit passage of said divided material past the blade elements.

7. Power transmission mechanism comprising, in combination with a vertically disposed shaft, a driving member and a driven member coaxially mounted on the shaft and forming between them a chamber for the reception of finely divided material having an appreciable coefficient of internal friction, said driving member comprising blade elements having inclined surfaces and having outer edges parallel with the inner surface of the driven member and cut away at points nearer the axis of rotation, said blade elements cooperating with an amount of such material partially filling said chamber to lift the material and form drifts thereof serving when acted on by centrifugal force to transmit power from the driving member to the driven member.

8. A clutch comprising a vertical shaft, a driving member and a driven member coaxially mounted on said shaft and forming between them a chamber, said chamber being partially filled with a finely divided material, said driving element comprising a blade having a driving surface inclined with respect to an axial plane and shaped with respect to the driven member to permit passage of said finely divided material past the blade.

9. A clutch comprising a vertical shaft, a driving member and a driven member coaxially mounted on said shaft and forming between them a chamber, said chamber being partially filled with a finely divided material, said driving element comprising a plurality of blades having driving surfaces inclined with respect to an axial plane and shaped with respect to the driven member to permit passage of said finely divided material past the blades.

10. A clutch comprising a vertical shaft, a driving member and a driven member coaxially mounted on said shaft and forming between them a chamber, said chamber being partially filled with a finely divided material and said driving element comprising a plurality of symmetrically disposed apertured blades having driving surfaces inclined with respect to an axial plane.

11. A clutch comprising a vertical shaft, a driving member and a driven member coaxially mounted on said shaft and forming between them a chamber, said chamber being partially filled with a finely divided material and said driven element comprising a drum having an upwardly and outwardly inclined inner surface and said driving member comprising a blade shaped with respect to the driven member to permit passage of said finely divided material past the blade.

12. A clutch comprising a vertical shaft, a driving member and a driven member coaxially mounted on said shaft and forming between them a chamber, said chamber being partially filled with a finely divided material, said driven element comprising a drum having an upwardly and outwardly inclined inner surface, and said driving member comprising a plurality of inclined apertured blades.

CARL AUGUST RUDQVIST.